United States Patent [19]

Leoni

[11] 4,172,570

[45] Oct. 30, 1979

[54] LANDING GEAR IN-FLIGHT VIBRATION DAMPENER

[75] Inventor: Ray D. Leoni, Woodbridge, Conn.

[73] Assignee: The United States of America as represented by the Secretary of the Army, Washington, D.C.

[21] Appl. No.: 869,090

[22] Filed: Jan. 13, 1978

[51] Int. Cl.² .......................... B64C 25/04; F16F 7/10
[52] U.S. Cl. ................................ 244/17.17; 188/1 B; 244/104 CS; 267/34
[58] Field of Search ............... 244/17.11, 17.13, 17.23, 244/17.27, 17.25, 100 R, 104 R, 104 CS, 104 FP, 104 LS; 188/1 B; 248/358 R, 22, 23; 416/500; 267/34

[56] References Cited

U.S. PATENT DOCUMENTS

| | | | |
|---|---|---|---|
| 1,104,429 | 7/1914 | Lacrotte | 244/104 CS |
| 1,653,361 | 12/1927 | Krammer | 244/104 CS |
| 2,691,496 | 10/1954 | Katzenberger | 244/104 FP |
| 3,128,064 | 4/1964 | Mooney | 244/104 R |
| 4,042,070 | 8/1977 | Flannelly | 244/17.27 |

FOREIGN PATENT DOCUMENTS 450519  5/1914  France ................................ 244/104 CS Primary Examiner—Galen L. Barefoot
Attorney, Agent, or Firm—Nathan Edelberg; Norman L. Wilson, Jr.; Robert P. Gibson

[57] ABSTRACT

During flight, helicopter landing gears are suspended by a tuning spring from the helicopter airframe to provide limited relative movement between the landing gear masses and the airframe. As the aircraft vibrates due to vertical or in-plane forces at the rotor head, the landing gear masses react oppositely thereto, thus generating balancing forces which are applied to the airframe to balance the rotor excitations.

6 Claims, 5 Drawing Figures

LANDING GEAR IN-FLIGHT VIBRATION DAMPENER

BACKGROUND AND SUMMARY OF THE INVENTION

Helicopter main landing gears typically may weigh 2 to 3 percent of the gross weight of the aircraft, and heretofore the landing gears have served no useful function during flight. A conventional helicopter landing gear is disclosed in U.S. Pat. No. 1,912,840 to Havill wherein it is shown that the upper telescoping strut of the landing gear is connected to the airframe in such a way as to prevent any significant in-flight vibration absorbtion by the landing gear assembly. While the lower telescoping strut disclosed in the Havill patent is mounted for relative movement with respect to the airframe, the connection between the upper and lower telescoping struts again prevents significant vibration absorbtion during flight.

As shown in U.S. Pat. No. 2,487,653 issued to Heintze, it is known to provide a helicopter with means in the mounting of the blades of the helicopter for dampening and/or absorbing vibrations and isolating such vibrations from the airframe; however, again the landing gear assembly disclosed in the Heintze patent performs no useful function during flight.

According to the principles of the present invention, during flight, main landing gears of a helicopter are suspended by a tuning spring from the airframe to provide limited relative movement between the landing gears and the airframe. Upon landing, the landing gears are forced into rigid contact with the airframe, and thereafter the landing gear shock absorber functions in the conventional manner, to at least partially isolate the airframe from the shock associated with landing. In this manner, the main landing gears, which are of course indispensible elements of the helicopter for purposes of landing, also provide a necessary function during flight.

It is therefore the main object of the invention to provide a helicopter landing gear which is mounted in a novel manner to the helicopter airframe so as to provide a mass which will respond to and balance detrimental vibrational forces acting upon the airframe during flight.

BRIEF DESCRIPTION OF THE DRAWINGS

This, as well as other objects and advantages of the invention will become clearer upon a reading of the hereinbelow detailed description of a preferred embodiment of the invention in conjunction with the drawings wherein.

DESCRIPTION OF THE PREFERRED EMBODIMENT

With reference to the drawings, there is shown one preferred form of the novel landing gear, generally indicated by the numeral 10 and connected to a helicopter airframe, only partially shown and indicated by the numeral 12. It is noted at the outset that while only one landing gear is shown in detail, it is contemplated that mirror image landing gears will be mounted on each side of the aircraft.

Figure 1:
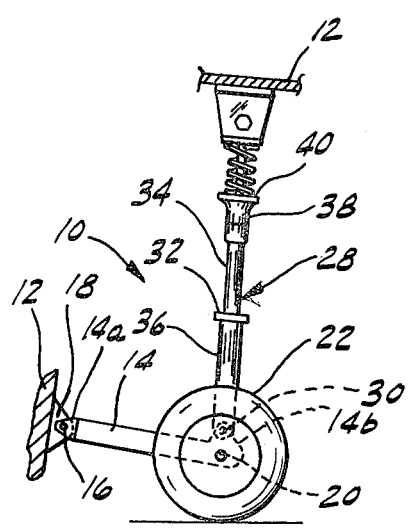
FIG. 1 is a side elevational view of a landing gear embodying the principles of the present invention.
Figure 2:
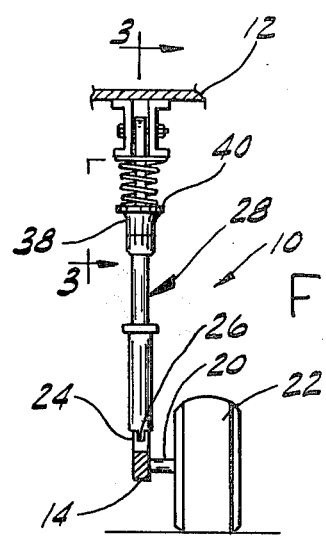
FIG. 2 is a front elevational view of the landing gear.

As shown in FIGS. 1 and 2, landing gear 10 includes a rigid drag beam 14 connected at a forward end 14a by pin 16 to a bracket 18 suitably secured to airframe 12. Pin 16 is parallel to the pitch axis, and drag beam 14 is parallel to the roll axis of the helicopter. The rearward end 14b of drag beam 14 carries wheel axle 20 which in turn rotatably secures wheel and tire assembly 22 to drag beam 14. Above axle 20 there is provided on drag beam 14 a bifurcated lug portion 24 into which is positioned and secured for pivotal movement a bottom lug portion 26 of oleo member 28 by means of pivot pin 30. Oleo member 28 includes a conventional landing shock absorber 32 including piston member 34 telescopically received within cylinder member 36 for dampened axial movement therebetween. The upper end portion of piston member 34 is secured to a sleeve member 38 having an upwardly-facing, annular flange surface 40.

Figure 3:
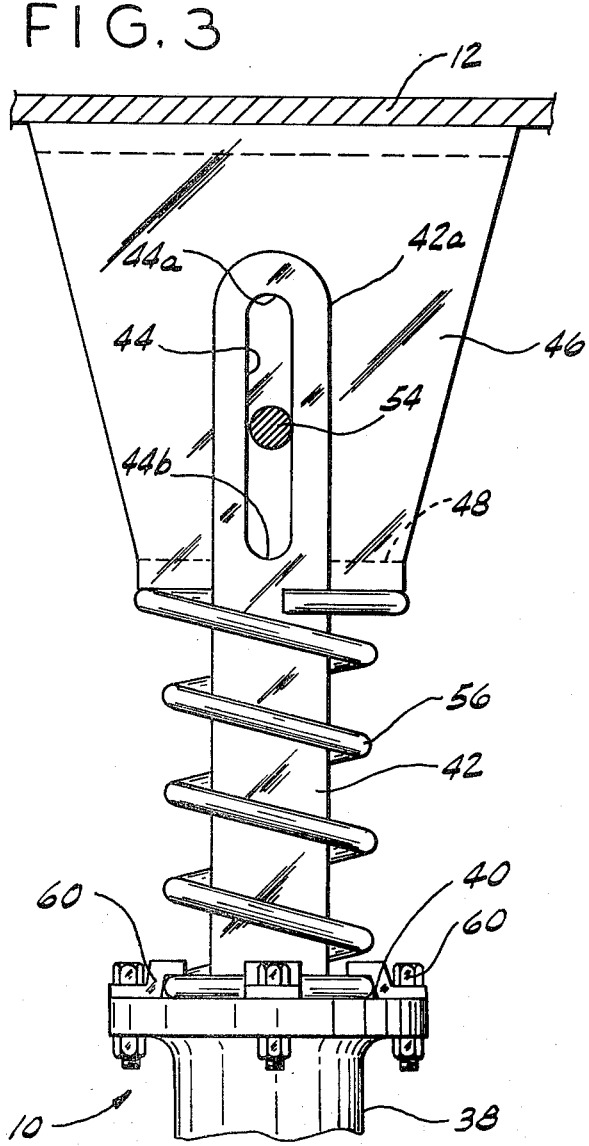
FIG. 3 is an enlarged view of the novel connection between the landing gear and the helicopter airframe taken along line 3—3 of FIG. 2.
Figure 4:
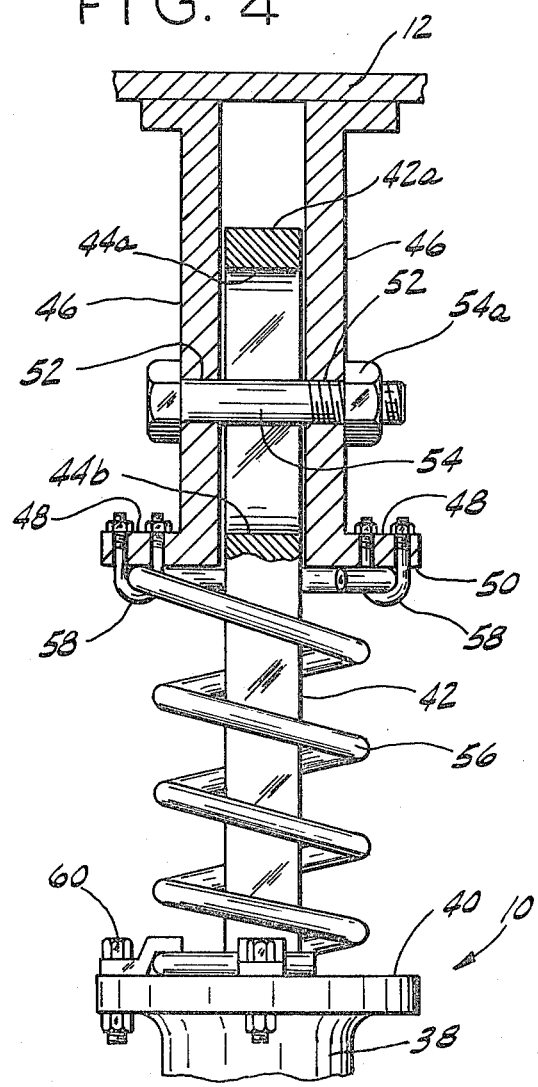
FIG. 4 is a view of the connection shown in FIG. 3 except rotated 90 degrees about a vertical axis.

As best seen in FIGS. 3 and 4, extending axially upwardly from sleeve 38 is a stabilizing rod 42 being rectangular in horizontal cross-section and having an elongated vertically-disposed slot 44 at the upper end portion 42a thereof. Upper end portion 42a is captured between two downwardly extending plates 46 affixed to the underside of airframe 12. Each of plates 46 includes an outwardly bent flange 48 having a bottom surface 50 parallel to surface 40 of sleeve 38. Further, each of plates 46 includes coaxial bores 52 through which a bolt or pin 54 is secured by nut 54a. Pin 54 also extends through slot 44 thereby permitting pivotal movement between oleo member 28 and airframe 12 and allowing for vertical movement therebetween limited by inside upper and lower surfaces 44a and 44b respectively of slot 44.

Between downwardly facing surfaces 50 of flanges 48 and upwardly facing, annular flange surface 40 of sleeve member 38 there is secured a tuning spring 56, at the top thereof by means of a plurality of U-bolt assemblies 58 and at the bottom by means of a plurality of clamp assemblies 60. The spring rate of tuning spring 56 is chosen such that spring 56, during flight, will pull the mass of the landing gear 10 upwardly into a position wherein pin 54 is at the vertical midpoint of slot 44 as is shown in FIG. 3 and 4.

OPERATION

During landings and while on the ground, the weight of airframe 12 acts to compress spring 56 until pin 54 abuts against lower surface 44b of slot 44. Thereafter oleo member 28 acts in a conventional manner to absorb the shock associated with landing by means of telescoping members 34 and 36.

Figure 5:
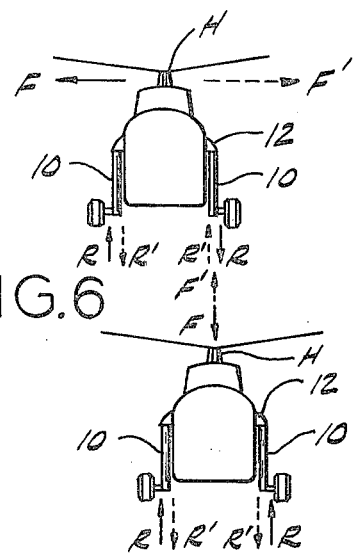
FIG. 5 is a schematic view of a helicopter showing the direction of typical vibrational forces and the directions of movement of the landing gear masses tending to dampen the vibrational forces.
Figure 6:
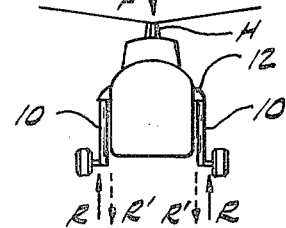
FIG. 6 is another schematic view of a helicopter showing other typical vibrational forces and directions of movement of the landing gear masses tending to dampen the vibrational forces.

During flight, landing gear 10 is suspended from airframe 12 by tuning spring 56 and is normally held in position by spring 56 so that pin 54 is located midway between upper and lower surfaces 44a and 44b of slot 44. As the airframe 12 begins to vibrate due to forces generated at the rotor head of the helicopter, the mass of landing gear 10 suspended by spring 56 will react in opposition to the forces to balance the forces and dampen the undesirable vibrations on the airframe. As depicted in FIG. 5, for example, inplane forces F and F' acting at the rotor head H tending to vibrate the helicopter airframe 12 about the roll axis may be balanced by reaction forces R and R' respectively, generated by the suspended masses of the landing gears 10. Likewise, FIG. 6 illustrates another example where vertical forces F and F' at rotor head H may be balanced by reaction forces R and R' respectively generated by the suspended masses of landing gears 10.

It can therefore be seen that an improved landing gear assembly has been disclosed hereinabove which is capable of performing the useful function during flight of balancing undesirable forces acting on the helicopter airframe to thus dampen the airframe vibrations produced thereby. It is of course contemplated that the invention may be used with other conventional in-flight vibration dampening apparatus to thereby further reduce airframe vibratory levels.

Inasmuch as numerous changes may be made to the preferred embodiment as disclosed herein without departing from the spirit and scope of the invention, it is requested that the scope of the invention be determined solely by the following claims.

I claim:

1. A helicopter rotor vibration dampener comprising: a known mass suspended from the helicopter air frame by a spring, wherein said mass and the spring rate of said spring are tuned to the vibrating frequency of the helicopter rotor, wherein said mass comprises a landing gear assembly including an oleo member and a ground contacting member; connecting means between said oleo member and the air frame for limited vertical motion of the mass relative to the air frame, wherein said mass and spring rate are also tuned to position the mass at the mid-range of its allowed limited vertical travel with no vibration nor landing loads on the landing gear.

2. The helicopter rotor vibration dampener of claim 1 wherein said mass includes dual landing gear assemblies, each assembly positioned laterally of the helicopter rotor axis.

3. The helicopter rotor vibration dampener of claim 1 wherein the connecting means are telescopic members, a in carried by the first of said telescopic members adapted for vertical travel within a vertical aligned slot carried by the second telescopic member.

4. A helicopter landing gear assembly comprising: an elongated oleo member connected at a lower end thereof to a helicopter supporting means and at an upper end thereof to a helicopter airframe member; means connected between said oleo member and said airframe member for permitting relative dampened movement therebetween during flight; and means carried by said members for limiting said relative movement during flight and for permitting said airframe member to rest on said oleo member when the helicopter is landed, said means comprising a pair of horizontally-spaced vertically-disposed plates affixed to one of said members and a vertical stabilizing rod affixed to the other of said members and positioned between said plates; a vertically-disposed slot in said rod and a horizontal pin carried by and between said plates and passing through said slot.

5. A helicopter landing gear assembly as specified in claim 4 wherein:
said means connected between said oleo member and said airframe member is a spring possessing a spring rate which, during flight, will normally hold said oleo member with respect to said airframe member so that said pin is in substantially the vertical midpoint of said slot and will permit dampened movement therebetween during flight; said spring compressing to allow said pin to rest on said rod when the helicopter is landed.

6. A helicopter landing gear assembly as specified in claim 5 wherein:
said plates are affixed to said airframe member and said rod is affixed to said oleo member.

* * * * *